US008620059B2

(12) United States Patent
Groves et al.

(10) Patent No.: US 8,620,059 B2
(45) Date of Patent: Dec. 31, 2013

(54) CHARACTERIZING WOOD FURNISH BY EDGE PIXELATED IMAGING

(75) Inventors: Conrad Kevin Groves, Delta (CA); Chunping Dai, Vanvouver (CA)

(73) Assignee: FPInnovations, Pointe Claire (CA)

( * ) Notice: Subject to any disclaimer, the term of this patent is extended or adjusted under 35 U.S.C. 154(b) by 738 days.

(21) Appl. No.: 11/955,731

(22) Filed: Dec. 13, 2007

(65) Prior Publication Data
US 2009/0154774 A1  Jun. 18, 2009

(51) Int. Cl.
| G06K 9/00 | (2006.01) |
| G06K 9/62 | (2006.01) |
| B07C 5/00 | (2006.01) |
| G01N 15/02 | (2006.01) |
| G01B 11/02 | (2006.01) |

(52) U.S. Cl.
USPC ........... 382/141; 382/228; 209/577; 356/335; 356/496

(58) Field of Classification Search
USPC ....................................... 382/141
See application file for complete search history.

(56) References Cited

U.S. PATENT DOCUMENTS

| 3,869,110 | A | | 3/1975 | Brock et al. |
| 3,901,388 | A | | 8/1975 | Kelly |
| 4,075,462 | A | | 2/1978 | Rowe |
| 4,252,240 | A | * | 2/1981 | Satake ........................ 209/580 |
| 4,357,169 | A | | 11/1982 | Trujillo |
| 4,383,864 | A | | 5/1983 | Trujillo |
| 4,618,230 | A | | 10/1986 | Ens et al. |
| 4,624,367 | A | * | 11/1986 | Shafer et al. ................. 209/577 |
| 4,775,455 | A | | 10/1988 | Chandramouli et al. |
| 4,806,015 | A | | 2/1989 | Cottingham |
| 4,827,144 | A | | 5/1989 | Zaitsu et al. |
| 4,830,194 | A | * | 5/1989 | Kajiura et al. ................. 209/580 |
| 4,871,251 | A | | 10/1989 | Preikschat et al. |
| 5,012,118 | A | | 4/1991 | Preikschat et al. |
| 5,133,602 | A | | 7/1992 | Batchelder et al. |
| 5,191,388 | A | | 3/1993 | Kilham |
| 5,290,541 | A | | 3/1994 | Liang |
| 5,306,487 | A | | 4/1994 | Karapasha et al. |

(Continued)

FOREIGN PATENT DOCUMENTS

| CA | 2317906 A1 * | 4/2001 | ............ G01N 21/89 |
| DE | 3213687 A1 | 10/1983 | |

(Continued)

OTHER PUBLICATIONS

Sei-Xing, Wang et al., Online Particle Size Estimation on One-Pass Edge Detection and Particle Shape, Proceedings of the Fourth International Conference on Machine Learning and Cybernetics, Guangzhou, Aug. 18-21, 2005.

*Primary Examiner* — Jayesh A Patel
(74) *Attorney, Agent, or Firm* — Oyen, Wiggs Green & Mutala LLP

(57) ABSTRACT

A system for determining at least one characteristic of wood furnish from an upstream source. The system includes: an inclined panel comprising a transparent window having a top surface for the wood furnish to slide down; a lighting means adjacent the transparent window for lighting the wood furnish visible through a bottom surface of the window; an image capturing means adjacent the transparent window for capturing an image of the wood furnish visible through the bottom surface of the window; and a processing means in communication with the image capturing means for deriving from the captured images the at least one characteristic of the wood furnish.

18 Claims, 13 Drawing Sheets

(56) References Cited

U.S. PATENT DOCUMENTS

| | | | | |
|---|---|---|---|---|
| 5,309,215 A | * | 5/1994 | Schumann | 356/335 |
| 5,426,501 A | | 6/1995 | Hokanson et al. | |
| 5,438,408 A | | 8/1995 | Weichert et al. | |
| 5,452,602 A | | 9/1995 | Astakhov et al. | |
| 5,519,793 A | * | 5/1996 | Grannes | 382/266 |
| 5,682,235 A | | 10/1997 | Igushi | |
| 5,721,433 A | | 2/1998 | Kosaka | |
| 5,738,162 A | | 4/1998 | Crafton | |
| 5,786,894 A | * | 7/1998 | Shields et al. | 356/338 |
| 5,850,866 A | | 12/1998 | Crafton | |
| 5,901,775 A | | 5/1999 | Musschoot et al. | |
| 5,924,473 A | | 7/1999 | Musschoot | |
| 5,939,021 A | | 8/1999 | Hansen et al. | |
| 5,957,188 A | | 9/1999 | Crafton | |
| 5,960,104 A | * | 9/1999 | Conners et al. | 382/141 |
| 5,967,222 A | | 10/1999 | Musschoot et al. | |
| 6,040,544 A | * | 3/2000 | Schantz et al. | 209/577 |
| 6,061,130 A | | 5/2000 | Plate et al. | |
| 6,137,894 A | * | 10/2000 | Ahonen et al. | 382/110 |
| 6,188,784 B1 | * | 2/2001 | Linker, Jr. | 382/146 |
| 6,252,661 B1 | * | 6/2001 | Hanna | 356/497 |
| 6,265,683 B1 | * | 7/2001 | Flottmann et al. | 209/576 |
| 6,347,976 B1 | | 2/2002 | Lawton et al. | |
| 6,453,982 B1 | | 9/2002 | Musschoot et al. | |
| 6,480,276 B1 | | 11/2002 | Jiang | |
| 6,546,352 B2 | | 4/2003 | Jahn | |
| 6,629,010 B2 | | 9/2003 | Lieber et al. | |
| 6,659,844 B2 | | 12/2003 | Shaw | |
| 6,728,594 B1 | | 4/2004 | Kiernan et al. | |
| 6,771,370 B2 | | 8/2004 | Sevick-Muraca et al. | |
| 6,802,907 B2 | | 10/2004 | Lewis, III et al. | |
| 6,805,245 B2 | * | 10/2004 | Kenneway | 209/538 |
| 6,885,904 B2 | * | 4/2005 | Lieber et al. | 700/109 |
| 6,960,478 B2 | | 11/2005 | Watkins et al. | |
| 7,020,307 B2 | | 3/2006 | Hinton et al. | |
| 7,227,165 B2 | * | 6/2007 | Hubert et al. | 250/559.25 |
| 7,292,949 B2 | * | 11/2007 | Ding | 702/81 |
| 2001/0040015 A1 | * | 11/2001 | Lee | 162/9 |
| 2002/0042689 A1 | | 4/2002 | Jahn | |
| 2003/0013083 A1 | | 1/2003 | Tsai | |
| 2003/0228248 A1 | | 12/2003 | Kwon et al. | |
| 2006/0055934 A1 | * | 3/2006 | Sunshine et al. | 356/446 |
| 2006/0221338 A1 | * | 10/2006 | Canty et al. | 356/335 |

FOREIGN PATENT DOCUMENTS

| | | | |
|---|---|---|---|
| DE | 4218638 A1 | | 10/1992 |
| DE | 4218638 A1 | | 12/1992 |
| EP | 0098087 A2 | | 1/1984 |
| EP | 0449116 A1 | | 10/1991 |
| EP | 0547787 A1 | | 6/1993 |
| EP | 0717795 B1 | | 5/2000 |
| EP | 1288162 A2 | | 3/2003 |
| EP | 1568669 A1 | | 8/2005 |
| GB | 497593 | | 3/1938 |
| GB | 2264556 A | | 9/1993 |
| JP | 61290362 A | | 12/1986 |
| JP | 62057433 A | | 3/1987 |
| JP | 62057434 A | | 3/1987 |
| JP | 63166424 A | | 7/1988 |
| JP | 63193463 A | | 8/1988 |
| JP | 63222238 A | | 9/1988 |
| JP | 63276873 A | | 11/1988 |
| JP | 03211459 A | | 9/1991 |
| JP | 03257347 A | | 11/1991 |
| JP | 04166763 A | | 6/1992 |
| JP | 05002012 A | | 1/1993 |
| JP | 06100384 A | | 4/1994 |
| JP | 06315629 A | | 11/1994 |
| JP | 07043307 A | | 2/1995 |
| JP | 07142437 A | | 6/1995 |
| JP | 09178644 A | | 7/1997 |
| JP | 10185796 A | | 7/1998 |
| JP | 10318904 A | | 12/1998 |
| JP | 11133029 A | | 5/1999 |
| JP | 11352045 A | | 12/1999 |
| JP | 2001337027 A | | 12/2001 |
| JP | 2004020535 A | | 1/2004 |
| JP | 2005181110 A | | 7/2005 |
| WO | 92/21955 | | 12/1992 |
| WO | 01/77611 A1 | | 10/2001 |
| WO | 03/008929 A2 | | 1/2003 |
| WO | 03/104351 A1 | | 12/2003 |

* cited by examiner

CHARACTERIZING WOOD FURNISH BY EDGE PIXELATED IMAGING

TECHNICAL FIELD

The invention relates generally to systems and methods for characterizing wood furnish.

BACKGROUND

Characterizing wood furnish is important in the manufacture of engineered wood products including oriented strand board (OSB) and fibreboard.

For example, measuring the level of fines in wood furnish is important for optimizing OSB production. Fines are small wood particles that are generated as a byproduct during stranding. Fines are too small to be useful in OSB production. In drier woods, such as mountain pine beetle infested wood, fines can account for 5% to 40% of furnish after stranding. High fine levels greatly affect the volume and value recovery from raw wood. The percentage of fines generation is therefore a key indicator used by mills for gauging the production of quality of furnish in OSB production. It is estimated that for an average-sized mill, a 1% improvement in wood recovery by reducing fines would result in wood cost savings on the order of hundreds of thousands of dollars per year.

A number of variables affect fines generation including characteristics of the wood (e.g. species, moisture content, temperature, pest damage) and operating conditions of the strander (e.g. wood alignment, rotation speed, cutting angle, sharpness of cutting and scoring knives).

At present, the level of fines in furnish is typically measured by manual sampling and screening. This method is very slow and does not provide "real time" measurements. Fines generation is highly variable and significant changes can occur over very short time spans. Mill operators limited to manual sampling and screening are unable to make timely and effective adjustments in response to changes to the level of fines in wood furnish.

It is desirable to provide systems and methods that provide operators with real time, accurate measurements of wood furnish characteristics such as the level of fines.

SUMMARY OF THE INVENTION

One aspect of the invention provides a system for determining at least one characteristic of wood furnish from an upstream source. The system includes: an inclined panel comprising a transparent window having a top surface for the wood furnish to slide down; a lighting means adjacent the transparent window for lighting the wood furnish visible through a bottom surface of the window; an image capturing means adjacent the transparent window for capturing an image of the wood furnish visible through the bottom surface of the window; and a processing means in communication with the image capturing means for deriving from the captured images the at least one characteristic of the wood furnish.

Another aspect of the invention provides a method for determining at least one characteristic of wood furnish from an upstream source. The method includes the steps of: (a) providing an inclined panel comprising a transparent window; (b) receiving the wood furnish from the upstream source onto the inclined panel; (c) allowing the wood furnish to slide down a top surface of the transparent window; (d) directing light onto the wood furnish sliding down the top surface of the window through a bottom surface of the transparent window; (e) capturing images of the wood furnish sliding down the top surface of the window through a bottom surface of the transparent window; and (f) processing the captured images to derive the at least one characteristic of the wood furnish.

A further aspect of the invention provides a system for determining at least one characteristic of wood furnish from an upstream source. The system includes means for capturing images of the wood furnish; means for lighting the wood furnish; and a processing means in communication with the image capturing means for rendering an edge pixelated image of the captured image of the wood furnish and determining from the edge pixelated image and a calibration factor the at least one characteristic of wood furnish.

Yet another aspect of the invention provides a method for determining at least one characteristic of wood furnish. The method includes the steps of: (a) directing light onto the wood furnish; (b) capturing images of the wood furnish; (c) processing the captured images to render an edge pixelated image of the captured image of the wood furnish; and (d) determining from the edge pixelated image and a calibration factor the at least one characteristic of wood furnish.

Further applications of the invention and features of specific embodiments of the invention are described below.

BRIEF DESCRIPTION OF THE DRAWINGS

In drawings which depict non-limiting embodiments of the invention.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the description and drawings are to be regarded in an illustrative, rather than a restrictive, sense.

The invention relates generally to systems and methods for characterizing wood furnish. A camera scans wood furnish passing across a predetermined area lit by a light source. The scanned images are processed by image analysis techniques to determine edge pixel counts. A calibration factor is applied to the edge pixel count to render characteristics of the wood furnish.

The following description, by way of example, describes the invention in the context of measuring and controlling the level of fines in furnish for OSB production. However, the invention can be applied in the context of other engineered wood processing (e.g. production of fibreboards such as particle board, medium density fibreboard and high density fibreboard) where characterizing wood furnish may be useful.

Figure 1:
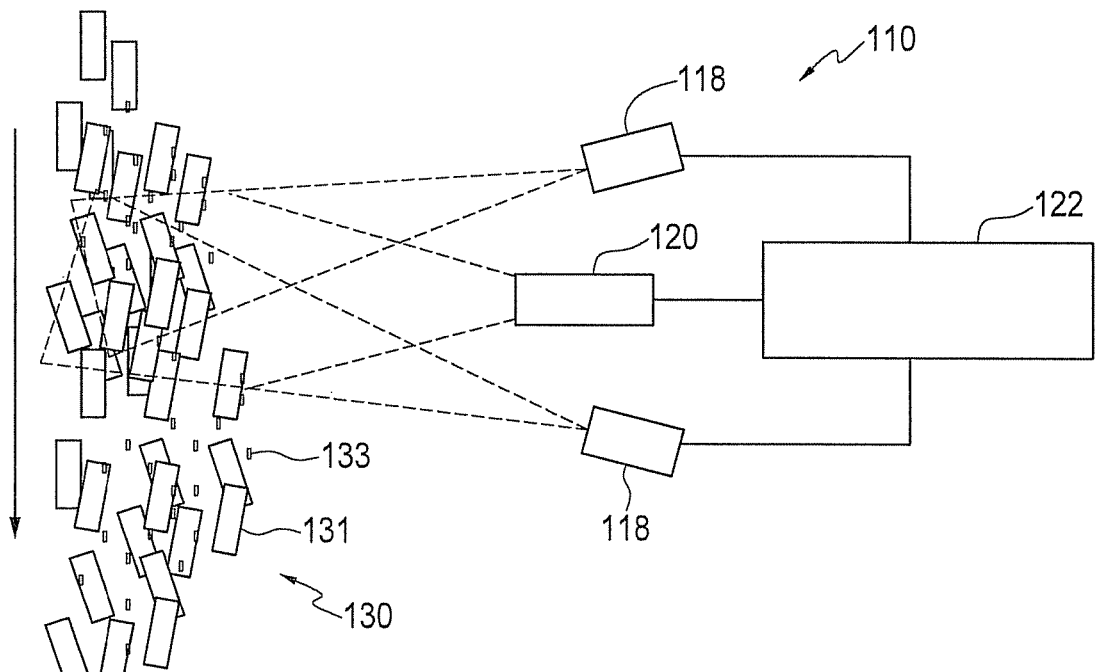
FIG. 1 shows a schematic view of a system according to an embodiment of the invention.

FIG. 1 shows one embodiment of the invention. System 110 includes one or more light sources 118, a camera 120, and a processor 122. Processor 122 is in communication with camera 20 and may be built in to the camera.

System 110 is positioned adjacent a free-falling stream of furnish 130. Furnish 130 consists of fines 133 and larger wood particles 131. Light sources 118 and camera 120 focus on a predetermined area through which furnish 130 falls. Furnish 130 free-falls from an overhead source, such as a strander or a downstream end of a belt conveyor.

Light sources 118 may be any high intensity low heat output light source such as a light emitting diode (LED), laser and fluorescent light.

Camera 120 may be any high speed, high sensitivity digital camera. For example, camera 120 may be a high speed black and white charge-coupled device (CCD) camera with a shutter speed of $1/10,000$ s and capable of capturing more than five images per second. An example of suitable camera with a built-in processor is the Sony™ XCI-V3 smart camera.

Processor 122 analyzes the images captured by camera 120. Processor 122 may include a computer loaded with software that correlates the level of fines with the number of edge pixels detected in a captured image. Correlation may be achieved using a calibration factor specific, for example, to the species of wood. For mixed species of wood, a weighted calibration factor based on the ratio of the species can be applied. Processor 122 thereby provides "real time" information about the level of fines in wood furnish 130 to the mill operator who can then make any remedial adjustments. In some embodiments, processor 122 may be provided with a warning limit function, wherein a visual and/or aural warning is communicated to the mill operator if the level of fines being detected in furnish 130 exceeds a maximum threshold.

Figure 3:
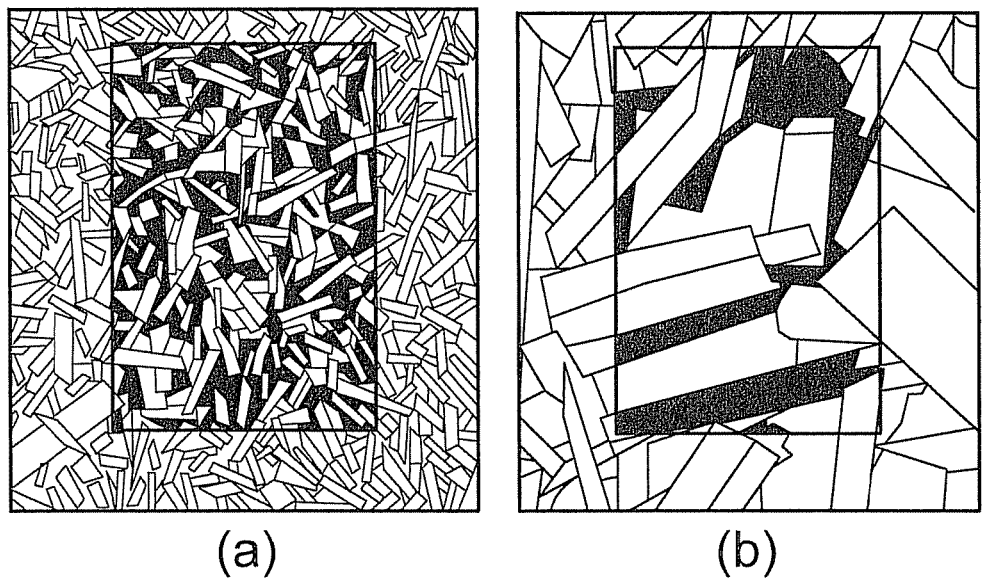
FIG. 3 shows illustrations of computer-generated pixelated images of wood furnish with fine levels of (a) 100% and (b) 0%.

Edge pixel detection obviates the need to separate the wood particles and to rely on any particular shape of particles during image processing. FIG. 3 shows illustrations of computer-processed images of wood furnish with edge pixels shown by the stippled boundary lines within the darkened rectangular region of interest. FIG. 3(a) is an illustration of an image of wood furnish with 100% fines, and FIG. 3(b) is an illustration of an image of wood furnish with 0% fines.

Figure 2:
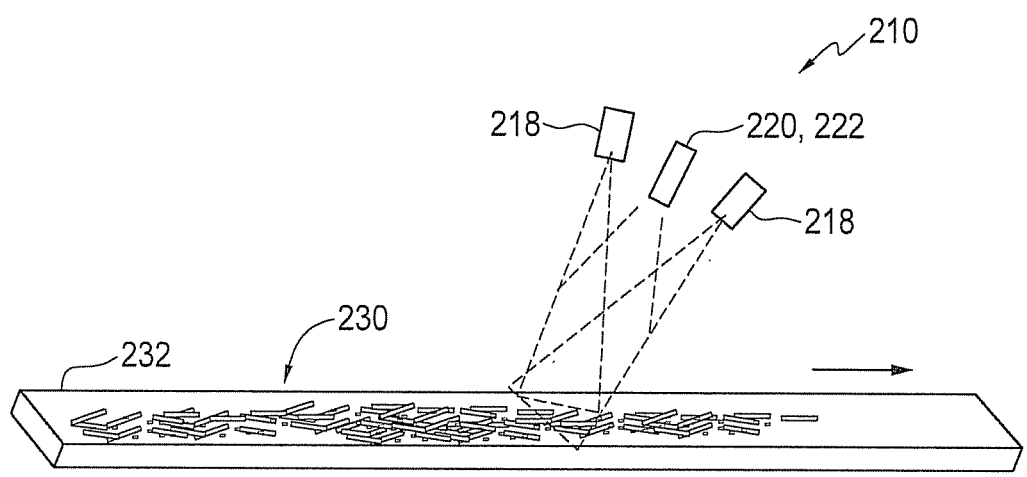
FIG. 2 shows a schematic view of a system according to another embodiment of the invention.

FIG. 2 shows another embodiment of the invention. System 210 includes light sources 218, a camera 220 and a processor 222 analogous to light sources 118, camera 120 and processor 122 respectively. Light sources 218 and camera 220 focus on a fixed focal area through which furnish 230 carried on a conveyor 232 passes.

Figure 4:
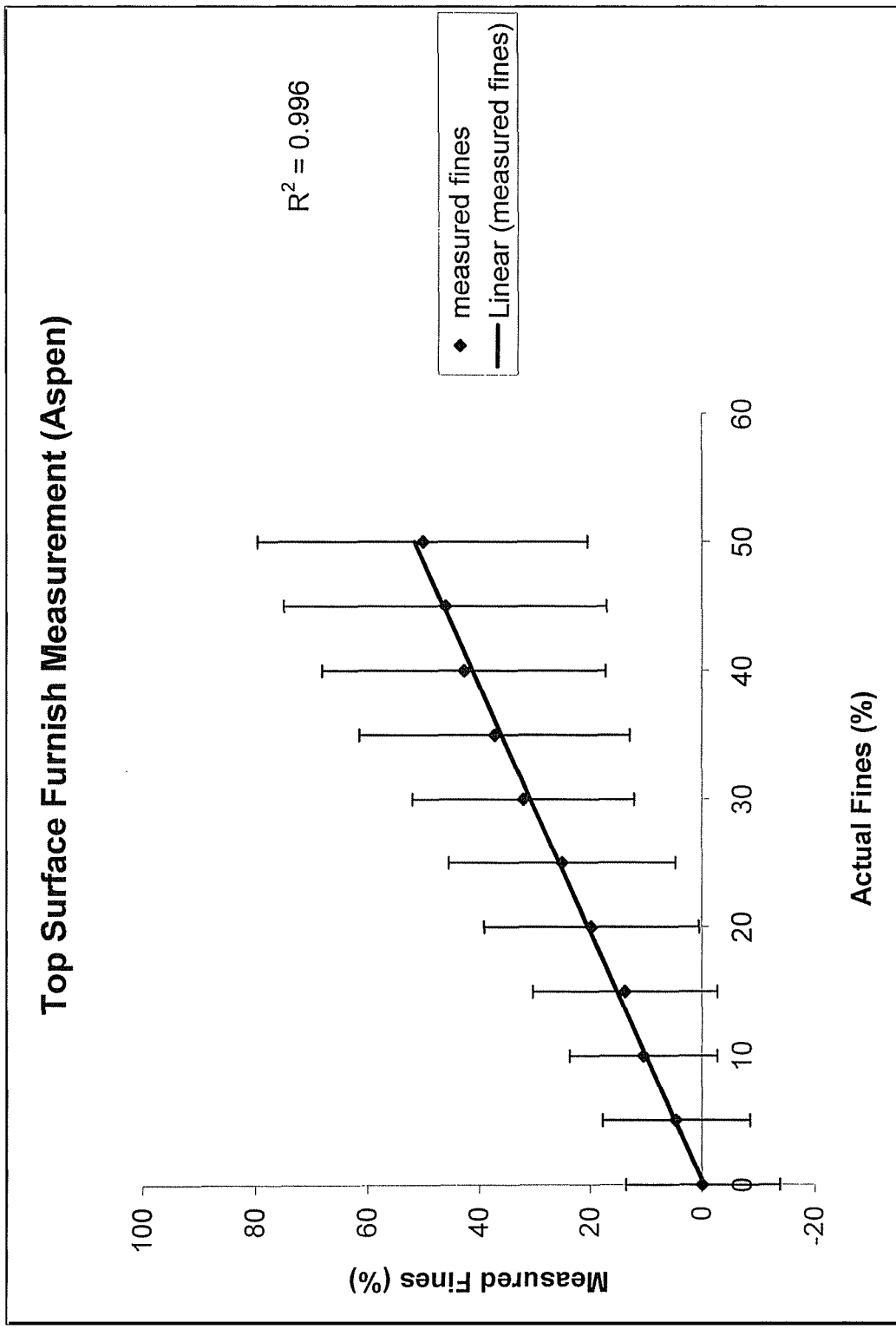
FIG. 4 is a graph plotting the percentage of fines in dry aspen furnish measured according to the embodiment shown in FIG. 2 against the percentage of actual fines in the furnish.
Figure 5:
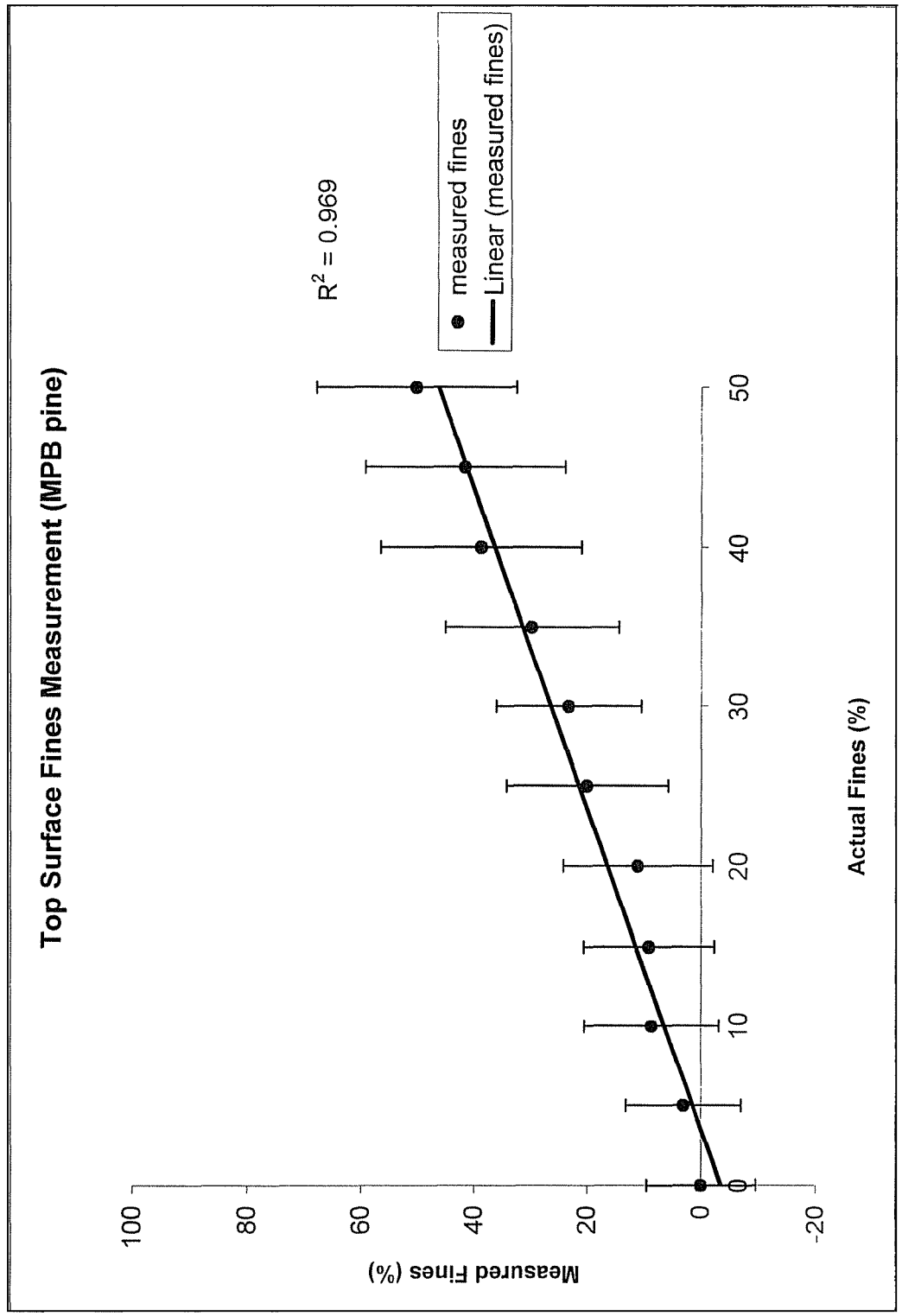
FIG. 5 is a graph plotting the percentage of fines in mountain pine beetle-infested pine furnish measured according to the embodiment of FIG. 2 against the percentage of actual fines in the furnish.

FIGS. 4 and 5 are graphs plotting the percentage of fines in furnish samples determined by system 210 against the actual percentage of fines in the samples, in an experimental example. The furnish samples used in FIG. 4 are dry aspen, and the furnish samples used in FIG. 5 are mountain pine beetle-infested pine. The measured percentages of fines correlate closely to the actual percentage of fines. The high $R^2$ values indicate a very good linear trend between the individual measurements of fine percentages.

Figure 6:
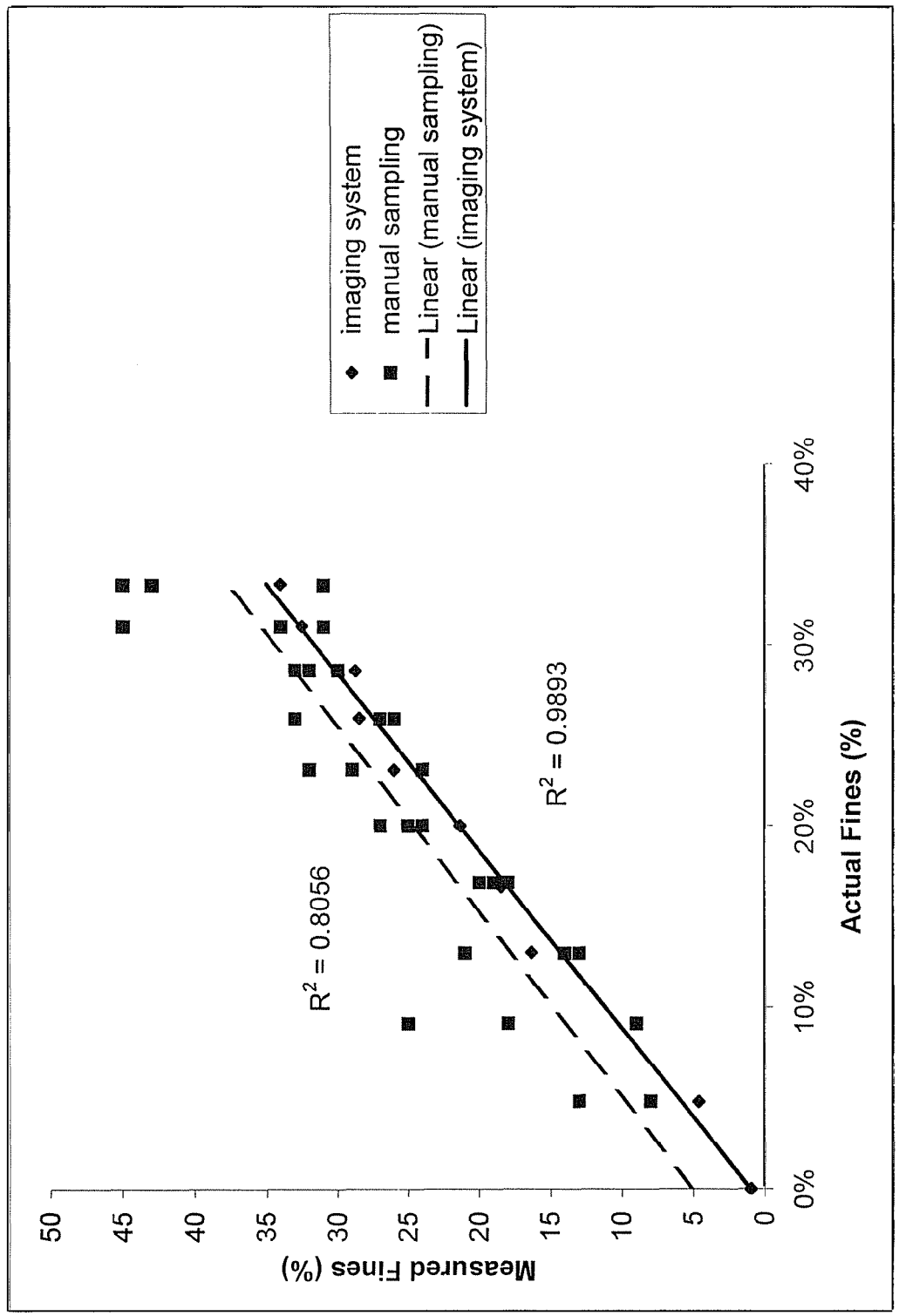
FIG. 6 is a graph comparing the plot of the percentage of fines in furnish measured according to the embodiment of FIG. 2 against the percentage of actual fines in the furnish, to the plot of the percentage of fines in furnish measured manually against the percentage of actual fines in the furnish.

FIG. 6 graphs two plots. The first plot is the percentage of fines in furnish measured by system 210 in an experimental example against the actual percentage of fines in the furnish. The second plot is the percentage of fines in furnish measured manually against the actual percentage of fines in the furnish. Compared to manual measurements, measurements by system 210 were found to correlate much better with the actual percentage of fines. The higher $R^2$ value ($R^2$=0.9893) with the measurements by system 210 show that the measurements determined by the present invention provide a more linear trend than that obtained with manual measurements.

Figure 7:
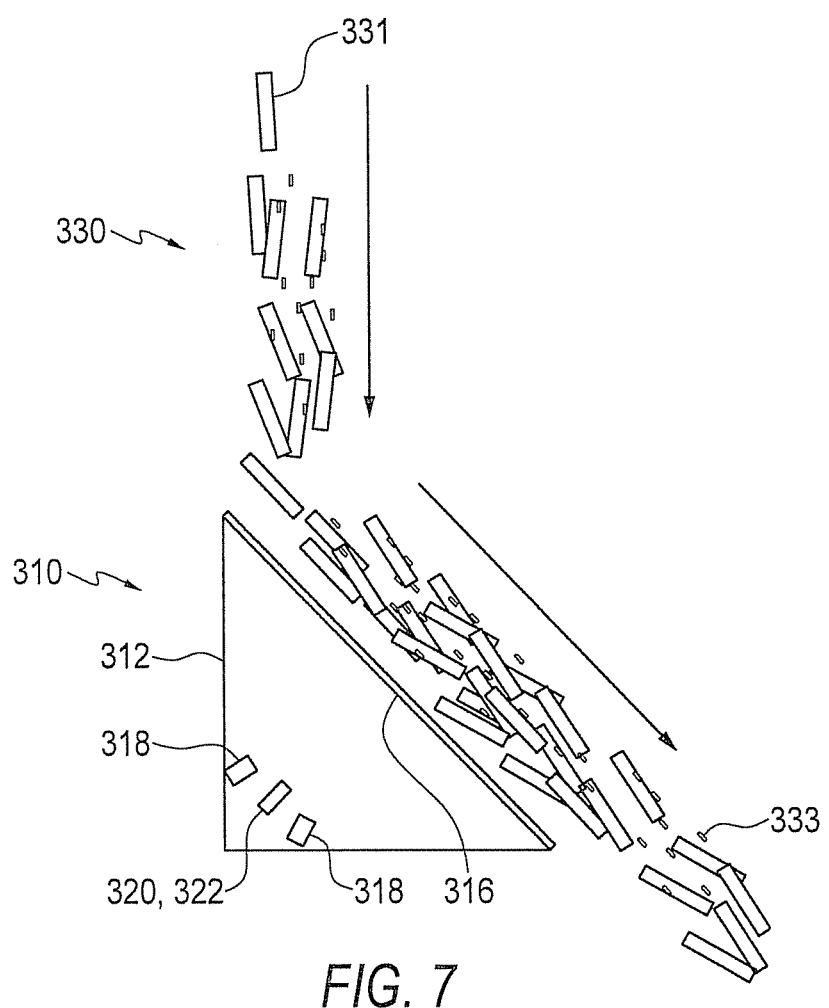
FIG. 7 shows a schematic view of a system according to a further embodiment of the invention.
Figure 8:
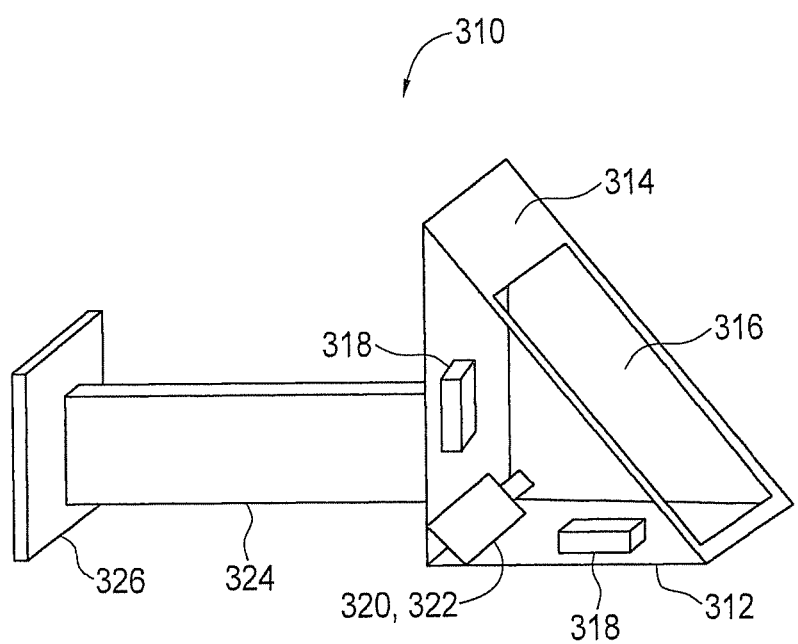
FIG. 8 shows a partial cutaway view of the embodiment shown in FIG. 7.

FIGS. 7 and 8 show a further embodiment of the invention. System 310 includes light sources 318, a camera 320 and a processor 322 analogous to light sources 118, camera 120 and processor 122 respectively. Light sources 318, camera 320 and processor 322 are housed in a wedge-shaped enclosure 312. A top side of enclosure 312 includes an inclined panel 314 (FIG. 8) with a transparent window 316.

Figure 9:
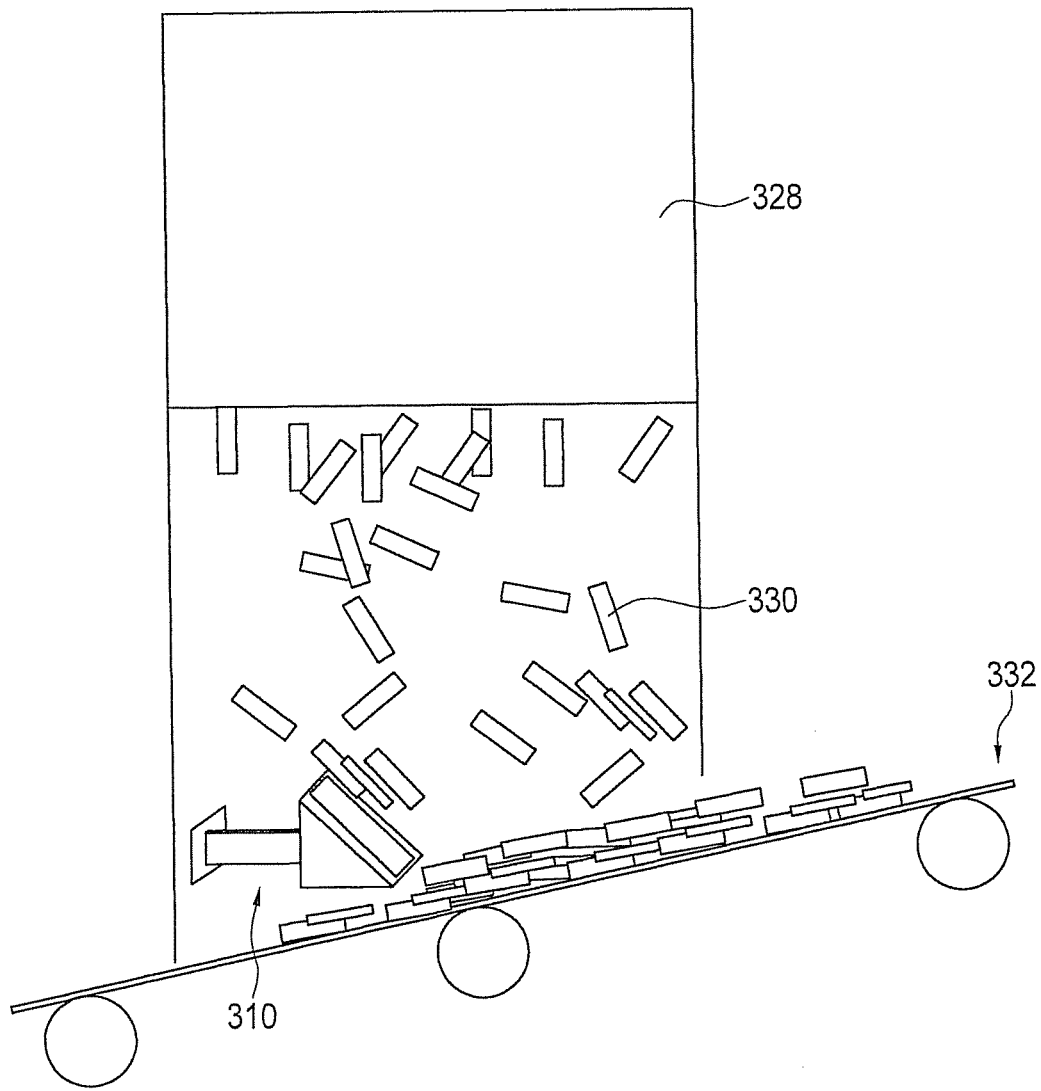
FIG. 9 shows the embodiment shown in FIG. 7 positioned below a strander.

FIGS. 8 and 9 show projection 324 fixed to and positioning system 310 directly below a source 328 of wood furnish 330. Wood furnish 330 falls freely onto and slides over window 316, or falls freely onto a part of panel 314 higher than window 316 and then slides over window 316. The source 328 of wood furnish 330 in FIG. 9 may, for example, be a strander, waferizer or flaker. The other end of projection 324 is fixed to a support plate 326 which in turn is fixed to a suitable structure in the mill. Conveyors 332 carries wood furnish 330 that slides off system 310, as well as wood furnish 330 that does not contact system 310, downstream for further processing.

Enclosure 312 is sealed to prevent dust, dirt and other matter from interfering with the function of light sources 318, camera 320 and processor 322. The walls of enclosure 312 are opaque except for transparent window 316. The opacity of enclosure 312 helps to shield camera 320 from unwanted lighting from the mill environment and provides consistent lighting to wood furnish 330 from light sources 318. Enclosure 312 may be formed in any shape that includes an inclined panel 314 and window 316. In some embodiments, panel 314 may consist entirely of window 316.

Panel 314 and window 316 are inclined at an angle sufficiently above horizontal for wood furnish 330 to slide off by gravitational force and/or displacement by the continual stream of wood furnish 330 from source 328. The angle of the incline may range from 45 to 75 degrees above the horizontal, for example. Window 316 is transparent and may be formed of a low friction, abrasion resistant material such as hardened glass or sapphire. Window 316 may be flat or any other profile that allows unobstructed sliding of wood furnish 330 along its top surface. Window 316 "self-cleans" from the continual impact of wood furnish 330 falling and sliding on its top surface.

Figure 10:
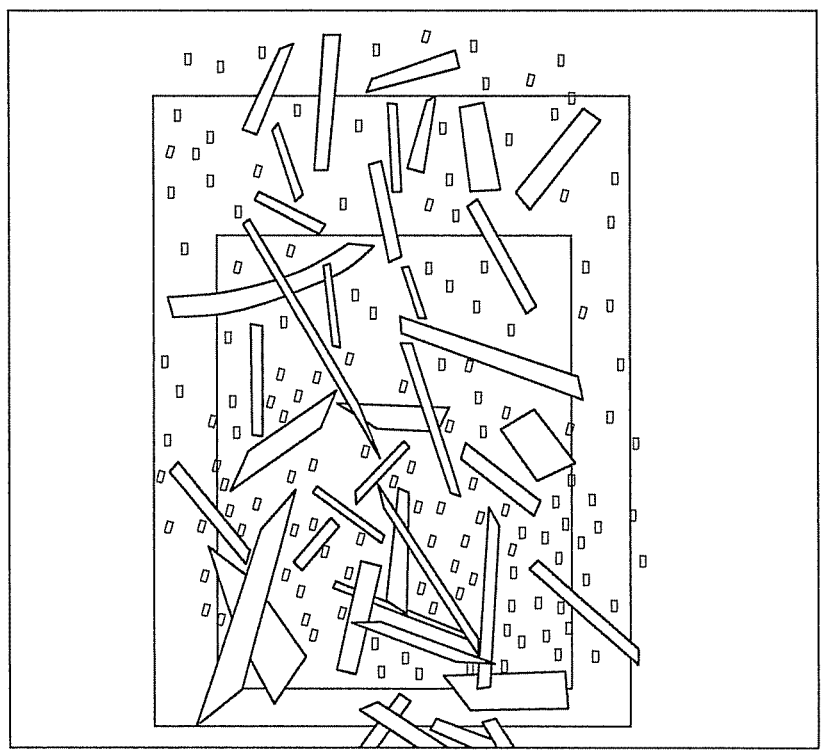
FIG. 10 is an illustration of an image captured from above the window of a system according to the embodiment shown in FIG. 7.
Figure 11:
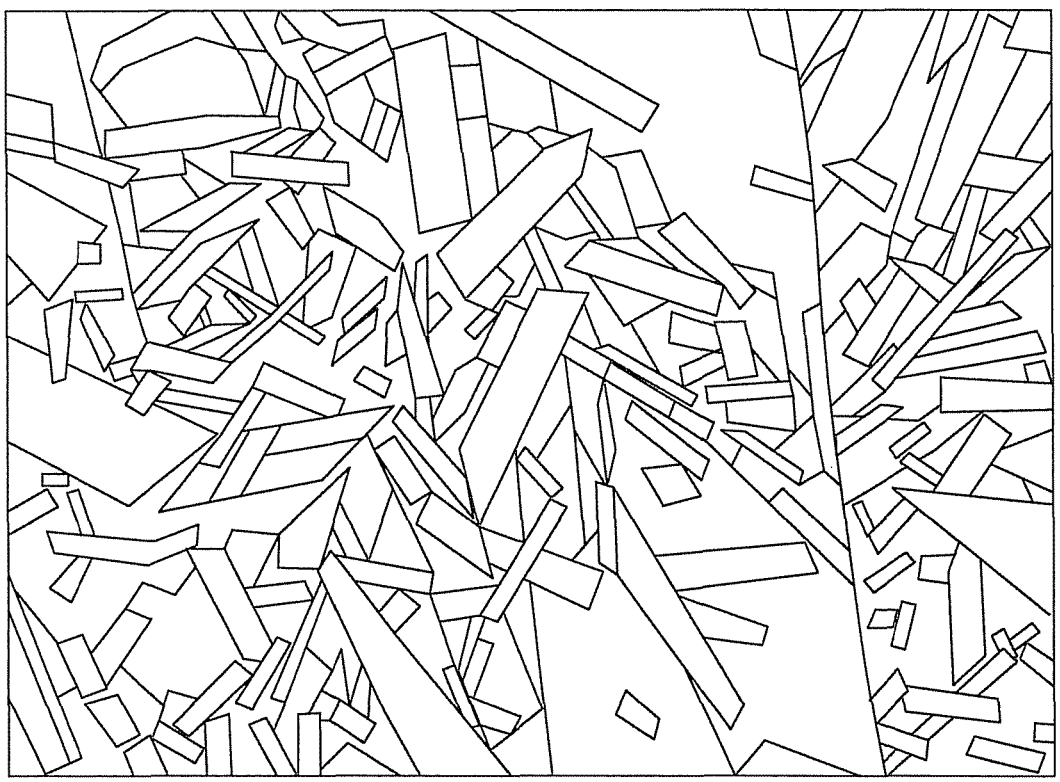
FIG. 11 is an illustration of a close-up image captured from below the window of a system according to the embodiment shown in FIG. 7.

Both light source 318 and camera 320 are focused on wood furnish 330 in contact with or in close proximity to the top surface of a predetermined area of window 316. The focal length of light source 318 and camera 320 can therefore be preset, obviating the need for manual or automatic adjustment during operation. Obtaining clear images is also assisted by the fact that wood furnish 330 tends to fall and slide flat against window 316. Obtaining clear images ensures more accurate image analysis by processor 322. FIGS. 10 and 11 are illustrations of sample images of wood furnish 330 taken by a camera 320 from above and from below window 316 in an experimental example.

Figure 12:
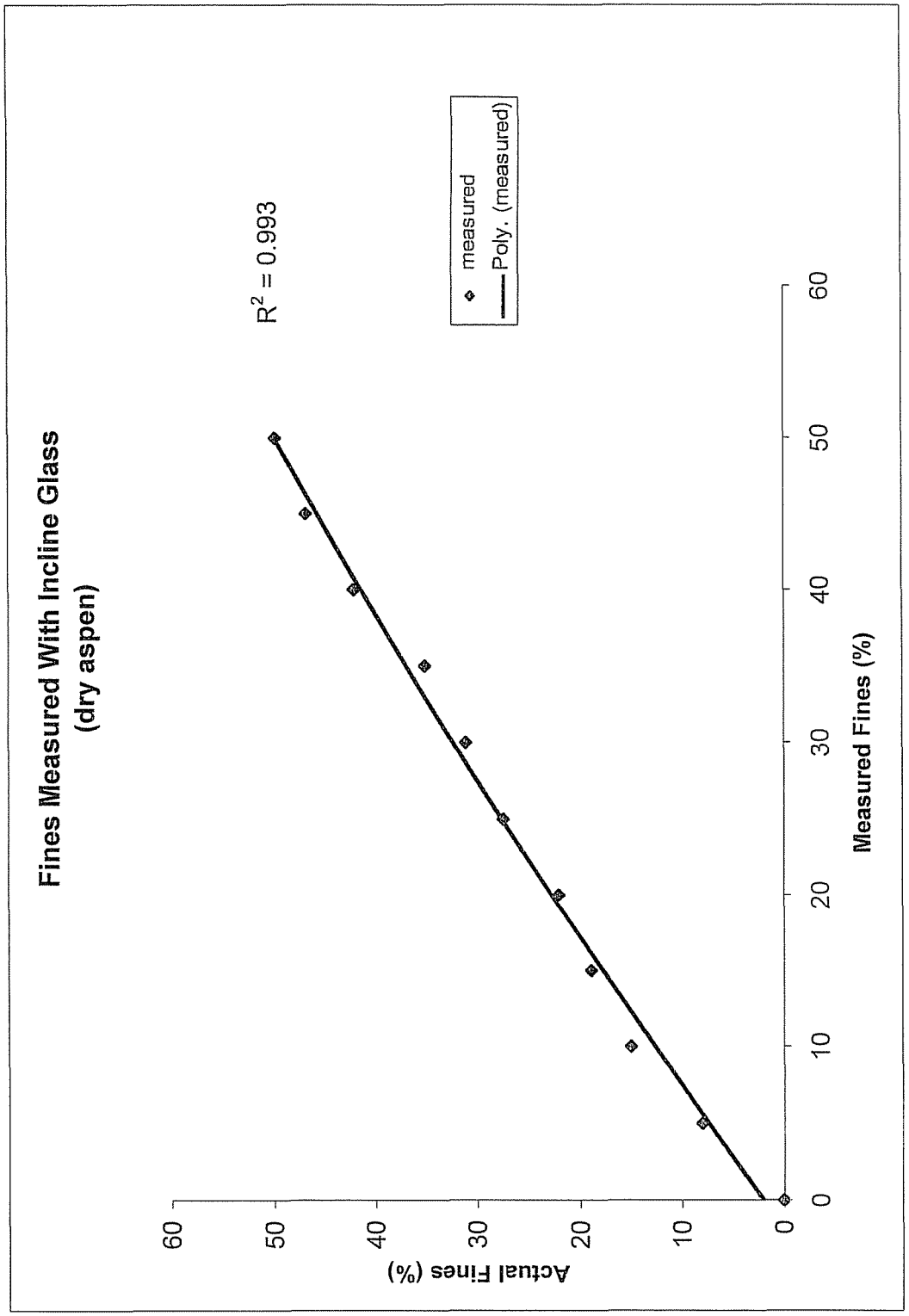
FIG. 12 is a graph plotting the percentage of fines in dry aspen furnish as measured by the embodiment shown in FIG. 7 against the actual percentage of fines in the furnish.

FIG. 12 is a graph plotting the percentage of fines in dry aspen samples determined according to system 310 in an experimental example against the actual percentage of fines in the samples. The measured levels of fines were found to correlate very closely to the actual levels of fines. The high $R^2$ value (>0.99) indicates a very good linear trend between the individual measurements of fine levels according to the invention.

Figure 13:
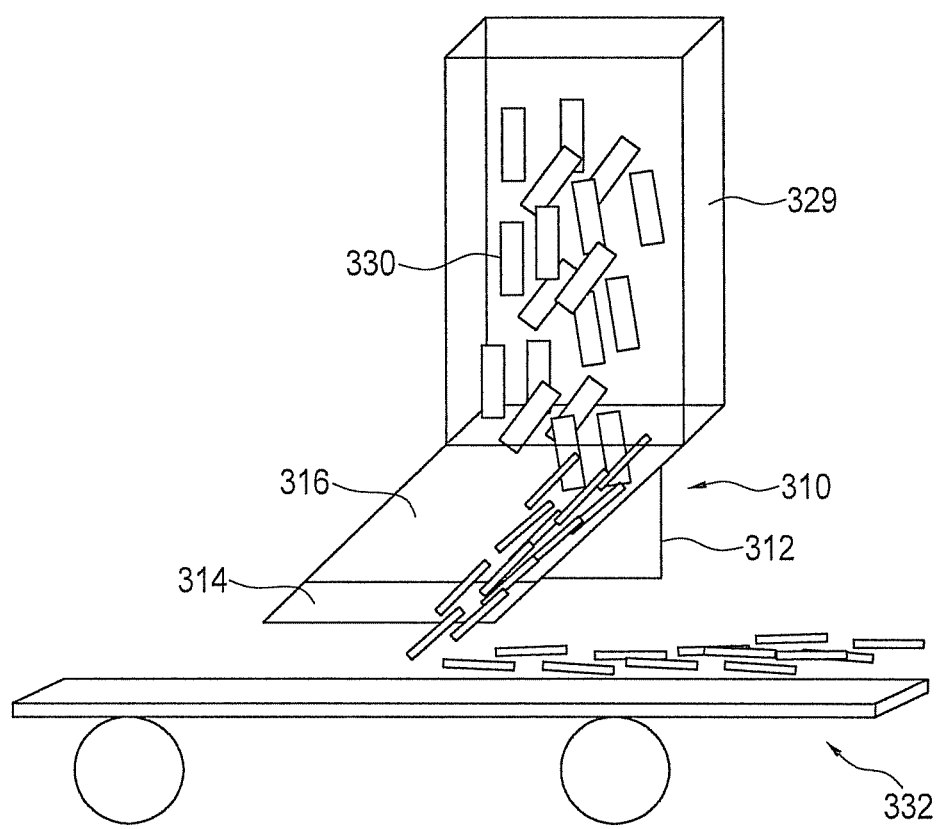
FIG. 13 shows the embodiment shown in FIG. 7 positioned below a drop chute.

FIG. 13 shows system 310 positioned directly below a drop chute 329 at a transfer point between an upstream conveyor (not shown) and a downstream conveyor 332. Wood furnish 330 from drop chute 329 slides down across inclined panel 314. As wood furnish 330 slides down across window 316, images of wood furnish 330 are captured by a camera (not shown) housed in enclosure 312 and the images are processed as described above to provide an operator with the level of fines in wood furnish 330. Wood furnish 330 slides off panel 314 and is carried downstream by conveyor 332 for further processing.

Figure 14:
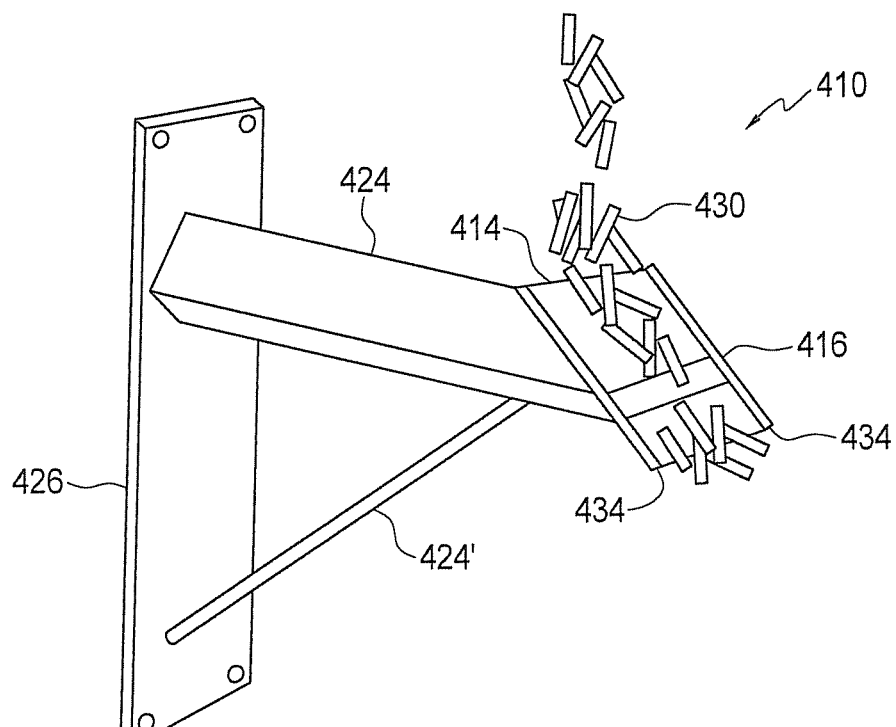
FIG. 14 shows a system according to a further embodiment of the invention.
Figure 15:
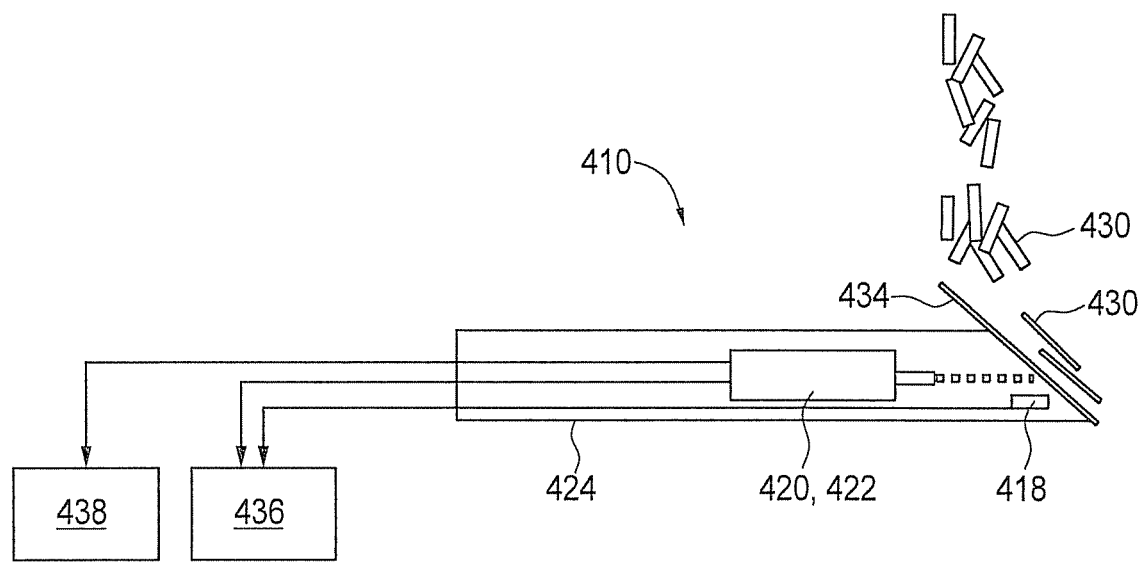
FIG. 15 shows a schematic side view of the embodiment shown in FIG. 14.

FIGS. 14 and 15 show a further embodiment of the invention, similar to system 310. System 410 has an inclined panel 414. Rails 434 along each side of panel 414 guide wood furnish 430 down across panel 413 and window 416. Window 416 is rectangular and may, for example, be approximately 1" in height and 3" in width. Camera 420 (with built-in processor 422) and light source 418 are housed in hollow projection 424. Panel 414 and window 416 form a distal side of supporting arm 424. Camera 420, processor 422 and light source 418 are connected to a power supply 436. Camera 420 and processor 422 are connected to an output 438. Projection 424 is supported by an additional support arm 424'. Both projection 224 and support arm 424' are fixed to support plate 426, which in turn is fixed to a suitable structure in the mill. Projection 424, support arm 424' and support plate 426 may be formed of a strong, lightweight material such as aluminum.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A system for determining at least one characteristic of wood furnish from an upstream source, the system comprising:
    an inclined panel comprising a transparent window having a top surface for the wood furnish to slide down and a bottom surface;
    a lighting means adjacent the transparent window for lighting the wood furnish visible through the bottom surface of the transparent window;
    an image capturing means adjacent the transparent window for capturing an image of the wood furnish visible through the bottom surface of the transparent window;
    a processing means in communication with the image capturing means for rendering an edge pixelated image of a captured image for determining at least one characteristic of the wood furnish; and
    a sealed enclosure housing the lighting means, the image capturing means and the processing means, and wherein the enclosure comprises the inclined panel.

2. A system according to claim 1 wherein a focal length of the lighting means is fixed for focusing on the wood furnish in contact with or in close proximity to the top surface of the transparent window.

3. A system according to claim 1 wherein a focal length of the image capturing means is fixed for focusing on the wood furnish in contact with or in proximity to the top surface of the transparent window.

4. A system according to claim 1 wherein the inclined panel is at an angle between 45 to 75 degrees above horizontal.

5. A system according to claim 1 wherein the at least one characteristic of the wood furnish is the percentage of fines.

6. A system according to claim 1 further comprising a projection for projecting the enclosure beneath the upstream source.

7. A system according to claim 1, further comprising a sealed hollow projection housing the lighting means, the image capturing means and the processing means, wherein the projection comprises the inclined panel, and wherein the projection projects the inclined panel beneath the upstream source.

8. A system according to claim 1 wherein the inclined panel consists of the transparent window.

9. A method for determining at least one characteristic of wood furnish from an upstream source, the method comprising:
    (a) providing an inclined panel comprising a transparent window;
    (b) receiving the wood furnish from the upstream source onto the inclined panel;
    (c) allowing the wood furnish to slide down a top surface of the transparent window;
    (d) directing light onto the wood furnish sliding down the top surface of the window through a bottom surface of the transparent window;
    (e) capturing images of the wood furnish sliding down the top surface of the window through a bottom surface of the transparent window;
    (f) rendering an edge pixelated image of a captured image to derive the at least one characteristic of the wood furnish, wherein the at least one characteristic is a percentage of fines.

10. A method according to claim 9 wherein in step (b) the wood furnish from the upstream source is received as a continuous stream.

11. A system for determining at least one characteristic of wood furnish from an upstream source, the system comprising:
    means for capturing images of a side of a stream of overlapping wood furnish;
    means for lighting the side of the stream of the overlapping wood furnish; and
    a processing means in communication with the image capturing means for rendering an edge pixelated image of a captured image of the overlapping wood furnish, wherein the edge pixelated image contains visually overlapping wood furnish, and determining from the number of edge pixels of the visually overlapping wood furnish the at least one characteristic of the wood furnish, wherein the at least one characteristic of the wood furnish is a percentage of fines.

12. A system according to claim 11 wherein the means for capturing images is configured to laterally capture images of a free-falling stream of the wood furnish.

13. A system according to claim 11 wherein the means for capturing images is configured to capture overhead images of the wood furnish on a conveyor.

14. A method for determining at least one characteristic of wood furnish, the method comprising:
 (a) directing light onto a side of a stream of overlapping wood furnish;
 (b) capturing images of the side of the stream of the overlapping wood furnish;
 (c) processing a captured image to render an edge pixelated image of the captured image of the overlapping wood furnish, wherein the pixelated image contains visually overlapping wood furnish; and
 (d) determining from the number of edge pixels of the visually overlapping wood furnish the at least one characteristic of the wood furnish, wherein the at least one characteristic of wood furnish is a percentage of fines.

15. A method according to claim 14 wherein the wood furnish is free-falling.

16. A method according to claim 14 wherein the wood furnish is on a conveyor.

17. A system according to claim 11 wherein the edge pixels are distinguished from the rest of the captured image.

18. A method according to claim 14 wherein step (c) comprises distinguishing the edge pixels from the rest of the captured image.

* * * * *

UNITED STATES PATENT AND TRADEMARK OFFICE
CERTIFICATE OF CORRECTION

| | |
|---|---|
| PATENT NO. | : 8,620,059 B2 |
| APPLICATION NO. | : 11/955731 |
| DATED | : December 31, 2013 |
| INVENTOR(S) | : Conrad Kevin Groves et al. |

Page 1 of 1

It is certified that error appears in the above-identified patent and that said Letters Patent is hereby corrected as shown below:

On the Title page, Inventors item (75) is amended as follows:

Inventors: Conrad Kevin GROVES, Delta (CA); Chunping DAI, Vancouver (CA)

Signed and Sealed this
Eighteenth Day of February, 2014

Michelle K. Lee
*Deputy Director of the United States Patent and Trademark Office*